June 5, 1951  A. K. K. ANDERSEN  2,555,389
BEET TOPPING MACHINE
Filed April 28, 1948  2 Sheets-Sheet 1
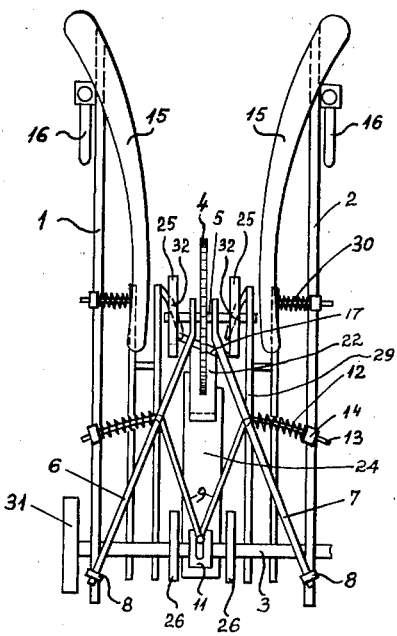
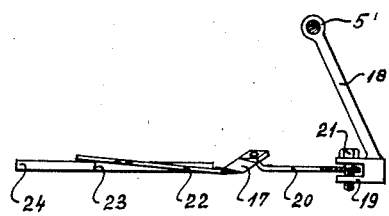
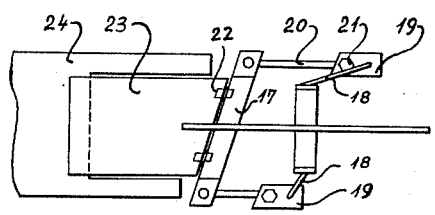
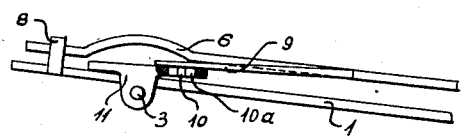
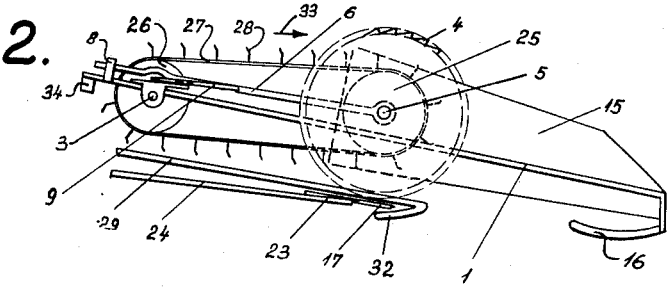
INVENTOR.

June 5, 1951
A. K. K. ANDERSEN
2,555,389
BEET TOPPING MACHINE
Filed April 28, 1948
2 Sheets-Sheet 2
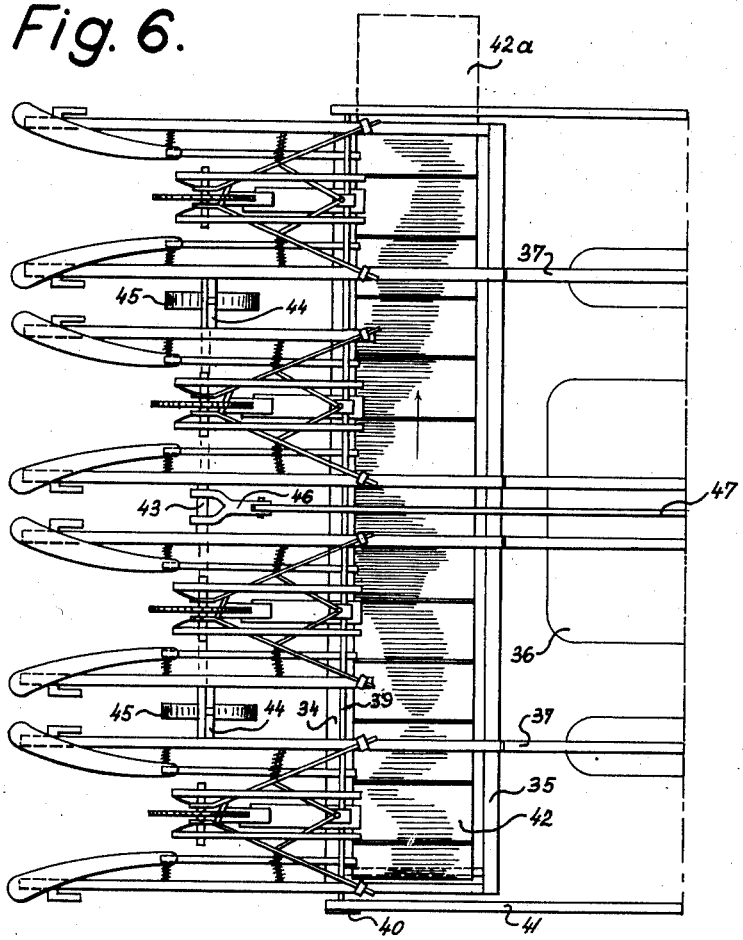
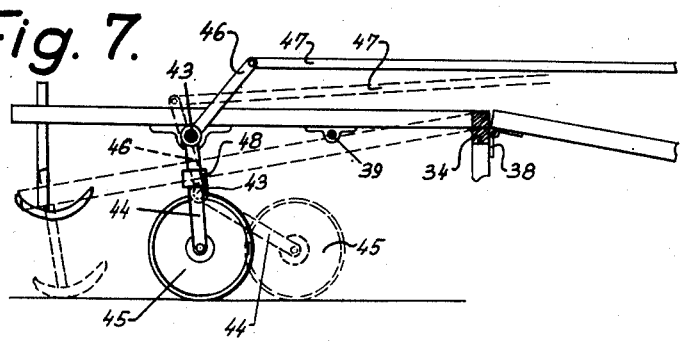
INVENTOR.
Anders Karl Kristian Andersen Patented June 5, 1951

2,555,389

UNITED STATES PATENT OFFICE 2,555,389

BEET TOPPING MACHINE

Anders Karl Kristian Andersen,
Stenstrup, Denmark

Application April 28, 1948, Serial No. 23,819
In Denmark April 29, 1947

4 Claims. (Cl. 56—121.41)

The present invention relates to an improved topping machine, by means of which beet, preferably sugar beet, are topped, and the tops carried away from the beet and conveyed to a vehicle driving alongside the topping machine.

Topping machines for beet are already known, in which a cutter member is connected to a toothed guide disc that runs over the upper end of the beet to be topped and thus adjusts the cutter in its cutting position, and which known machines have likewise means for conveying the severed tops rearwardly through the machine. An essential drawback in these known machines is that the guide disc and cutter member are incapable of lateral displacement to encounter irregularities in the position of the beets in a row, and consequently the guide wheel will not always run over the centre of the beet to be topped, and the severing of the top will be poor, or possibly will fail entirely.

The main object of the invention is to provide a beet topping mechanism which eliminates this drawback by automatically adjusting itself to the position of the beet in the row of beets, thereby ensuring a perfect severing of the beet top in every instance.

Another drawback in the hitherto known topping machine is the inability of the cutter member to adjust itself in relation to the guiding disc when this disc travels over the curved surface of a beet. When topping beet, a thin slice of the upper end of the beet is sliced off with the top, and upon biting into the beet substance the cutter is subjected to certain strains when the guide disc proceeds along its curved path over the beet top end. A second object of the present invention is therefore to provide means allowing the cutter member a certain amount of play in order to decrease the strain mentioned.

Another disadvantage of the hitherto known machines is the trouble caused by leaves of the beet that lie on the earth, as such leaves are liable to become entangled in machine parts and cause trouble in operation. This is remedied in the present machine by means of members that gather all such leaves and raise them to their proper position so that after being severed they may be conveyed through the machine.

In topping machines of known construction difficulties have been experienced in holding the beet to be topped in its proper erect position during the topping process, especially when the beet in question is not firmly embedded in the earth. This is remedied in the machine according to the present invention by means that firmly hold such beet while being topped.

It is essential that the tops of beet are kept clean in order that they may be stored for subsequent use as fodder. To this end the machine according to the invention is combined with a conveyor and elevator, by means of which the severed tops are carried to and ejected into a vehicle without contacting the earth. Such conveyors and elevators per se are commonly known, and any conventional type may be employed.

The topping machine according to the invention may, in view of the constructional advantages mentioned, be comparatively lightly built, thus allowing the assembly of a greater number than hitherto of topping mechanisms into a unit for simultaneously topping several rows of beet, for instance four. Such an assembly may be operated by means of a tractor, and it is thus possible to collect the severed tops from for instance four rows and simultaneously transfer them to a vehicle driving alongside the assembled machine, thereby increasing speed of work and decreasing operational costs, while at the same time practically clean tops are obtained suitable for subsequent ensilage.

Other advantages of the beet topping machine according to the invention will be apparent from the following description with reference to the drawing, in which Fig. 1 is a top elevation of the topping mechanism of a beet topping machine according to the invention, Fig. 2 a side elevation partly in section of the topping mechanism shown in Fig. 1, with some parts removed, Fig. 3 a side elevation of the cutter members of the topping mechanism on an increased scale, Fig. 4 a top elevation of the cutter members shown in Fig. 3, Fig. 5 a side elevation on an increased scale of the tilting and pivoting device for the carrier frame, partly in section, Fig. 6 a top elevation of a quadruple beet topping machine according to the invention, and Fig. 7 illustrates the means for raising the topping mechanisms of the quadruple machine shown in Fig. 6.

The topping mechanism illustrated in Figs. 1 and 2 comprises two relatively spaced and parallel lateral bars 1 and 2 which at their rear ends, in relation to the direction of drive, are interconnected by means of a shaft 3 journaled rotatably in the bars. Between these bars 1 and 2 the cutter members of the topping device are arranged together with a guide disc 4, which in known manner is provided with a toothed edge. The guide disc 4 is rigidly attached to a short transverse shaft 5 rotatable in the foremost end of a carrier frame comprising two arms 6 and 7. The rear ends of the arms 6 and 7 are longitudinally slidable in loops 8 attached to the lateral bars 1 and 2 respectively. Approximately at their middle part the two arms 6 and 7 are interconnected by means of a V-shaped connection 9, the rearwardly extending pointed end of which carries a pin 10, see Fig. 5, that engages an elongated slot 10a in a plate 11 tiltably mounted on the shaft 3 midways between the bars 1 and 2. Between the arms 6 and 7 and the bars 1 and 2 respectively are interposed pressure springs, preferably coil springs 12 mounted on guide rods 13 rigidly attached to the arms 6 and 7 and slidable in loops 14 attached to the bars 1 and 2. These springs 12 serve to keep the guide wheel 4 in a normal center position, but allows it to perform lateral displacements. The loops 8 and 14 allow furthermore a slight vertical displacement of the carrier frame.

Each lateral bar 1 and 2 carries at its foremost end a guide plate 15 by means of which drooping leaves of the beet to be topped are gathered and lifted to facilitate topping and preventing them in becoming entangled in any machine parts. Each lateral bar carries likewise a slide shoe 16 that serves to support the topping mechanism at a suitable distance above the earth. This shoe is in known manner adjustable vertically, and if desired it may be replaced by a small wheel.

The cutting members of the topping mechanism are shown in detail in Figs. 3 and 4. They comprise a flat narrow cutter 17, the ends of which are attached to the shaft 5 of the guiding disc 4 by means of connecting arms 18, each of which carries a block provided with a fork 19 in which the one end of a connecting rod 20 is inserted for vertical displacement therein. This end of the rod 20 has a smooth hole engaging an adjusting screw 21 by means of which the prongs of the fork 19 can be more or less contracted to alter the length of vertical displacement of the rod 20. The other end of the rod 20 is attached to the cutter member 17. The rear edge of the cutter member is hinged to a flat plate 22 which is vertically displaceable within a cut-away portion 23 in the foremost end of a slide plate 24 extending somewhat rearwardly of the shaft 3. The rear end of the cutter plate 22 extends slightly beyond the base edge of the cut-away portion 23 on which edge it rests. When the guide disc 4 runs over the top of a beet, it raises the cutter member that enters the upper end of the beet substance for removing the top together with a thin slice of the beet. During the continued vertical movement of the guide disc 4 while running over the beet the cutter will, on account on its play within the fork 19, be able to adapt its position in the beet to prevent upward strain, and during the downward run of the guide disc on the beet the flat plate 22 hinged to the cutter member may swing downwardly within the cut-away portion 23 of the slide plate 24. Thus a somewhat curved severing of the beet top takes place without undue strain being put on the cutter member.

At each side of the guide disc 4 the shaft 5 carries on its end a rigidly attached sprocket 25, and corresponding sprockets 26 are rigidly attached to the shaft 3 on either side of the tilting plate 11. Each pair of sprockets 25 and 26 on either side of the guide disc and tilting plate carries a chain 27, to which a number of outwardly projecting fingers 28 are attached, see Fig. 2.

Beneath the guide disc 4 and the cutting mechanism a number of slide rods 29 are arranged slightly higher than the slide plate 24 at either side thereof. These rods 29 are rigidly attached by their rear ends to the lateral bars 1 and 2, whereas their foremost ends, which are slightly curved upwardly, are rigidly interconnected and resiliently connected to the lateral bars 1 and 2 by means of interposed springs 30. To avoid obscurity of the drawing, the rearmost connection of the guide rods to the lateral bars is not shown, but may comprise any suitable means such as for instance a transverse bar.

The shaft 3 carries at one end outside the lateral bar 1 a transmission wheel 31, by means of which the shaft 3 is operated to rotation from a source of power, for instance a tractor.

Finally, to the foremost end of the slide rods 29 are attached stiff leaf springs 32 that are curved rearwardly towards the cutter member.

Briefly, the topping mechanism operates in the following manner. When being moved forwards along a row of beet by the traction force employed, for instance a tractor, the guide plates 15 lift the beet top, and the leaf springs 32 engage the sides of the beet and thus steer the guide disc 4 over the middle of the beet, and support the beet while the top is severed in the manner described above. During progress the shaft 3 is rotated, and with it the chain drives 25, 26, 27 are rotated together with the guide disc 4 in the direction indicated by the arrow 33 in Fig. 2. The fingers of the chain 27 move the severed tops along the slide rods 29 and slide plate 24 to the rear end of the mechanism. If a beet in the row is somewhat out of line, the leaf springs 32 will move the guide disc 4 with the cutting mechanism in alignment with the centre of the beet, the entire mechanism being moved laterally on the pin 10 and vertically on the tilting plate 11. As soon as the cutting mechanism has severed the top, the mechanism is returned to its centre position by means of the springs 12. Owing to the connection of the topping mechanism to the tiltable plate 11, and to the slidable arrangement of the arms 6 and 7 in relation to the lateral bars 1 and 2, the topping mechanism is independent of the lateral bars, and consequently no stresses due to lateral actuation caused by irregular positioning of the beet to be topped are transmitted to the supporting members of the mechanism.

As shown in Fig. 6 four topping mechanisms of the kind described above are assembled to a unit by means of a beam 34 traversing the rear ends of the four mechanisms, and to which beam the lateral bars 1 and 2 of each mechanism are rigidly attached. To this beam a conveyor frame 35 is rigidly attached between the assembled topping mechanisms and a tractor 36 that is employed as tractive power. The conveyor frame and the assembled topping mechanisms are connected to the tractor by means of four longitudinal beams 37 that are rigidly connected to the tractor body and by means of hinges 38 attached to the frame 35. The topping mechanisms are operated by means of a common shaft 39 journaled in the lateral bars 1 and 2 of all four topping mechanisms, and this shaft 39 carries on its one end a pulley 40 which, by means of a belt 41, is operated to rotation from one of the driving wheels of the tractor. The conveyor frame 35 extends along the entire width of the assembled topping mechanisms and is so disposed that the severed tops from the several topping mechanisms are discharged therein. The conveyor frame is provided with an endless belt 42 that moves in the direction indicated by the arrow in Fig. 6 transversely to the topping mechanisms, and is operated by any suitable means such as for instance bevel gearing from the shaft 39. The tops collected by the conveyor are ejected laterally from the machine. This conveyor is not described in detail, as its construction is commonly known. The machine is combined with an elevator 42a for conveying the severed tops to a suitable height for discharge into a vehicle driving alongside the machine. Such an elevator is likewise commonly known and is therefore not described in detail.

When transporting the machine to and from the place of work, or when turning from one direction of operation to another, the assembled topping mechanisms are raised on the aforesaid hinge connection 38 to the tractor.

Means for effectuating this raising and lowering of the topping mechanisms are shown in Fig. 7, in which a shaft 43 is journaled in bearings in two suitably interspaced lateral beams 1, 2. To each shaft end is rigidly attached the upper end of a fork 44, in the lower end of which a wheel 45 is journaled. At the center of the shaft 43 is attached the one end of an upwardly extending lever 46, the other end of which is attached to a connecting rod 47 attached to an operating lever, not shown, on the tractor, close to the driver's seat. Upon actuating the operating lever, the driver may by drawing the lever rearwardly move the wheels 45 to their forward position as shown in Fig. 7 in full lines, thus raising the topping mechanisms, and by moving the lever back, the wheels 45 are moved to their position shown in dotted lines, thereby again lowering the topping mechanisms. The fork 44 is provided with a rotation joint 48 that allows the wheels 45 to turn in a horizontal plane when being employed as traction wheels.

I claim:

1. In a beet topping machine, in combination, two spaced apart bars; a carrier frame attached to and disposed between said bars, said frame comprising two oblique arms being interconnected by a rearwardly extending connecting member, the rear ends of said oblique arms being slidably secured in loop members attached to said spaced apart bars; a cross shaft journaled into said two bars at the rear ends thereof; pivotal means connecting the rear end of said carrier frame to said shaft and being adapted to allow for the vertical and lateral displacement of said carrier frame relative to said bars, said pivotal means comprising a plate member provided with a longitudinal slot centrally attached to said cross shaft and tiltable transversely to said shaft, and a pin attached to the rear end of said connecting member and engaging said slot; a vertical guide member attached to the front end of said carrier frame; a horizontal cutter member below and attached to said guide member, said cutter member being movable in response to any movement of the guide member; and means for laterally guiding said guide member and cutter member in relation to a beet to be topped.

2. In a beet topping machine, in combination, two spaced apart bars; a carrier frame attached to and disposed between said bars; a cross shaft journaled into said two bars at the rear ends thereof; pivotal means connecting the rear end of said carrier frame to said shaft, said means being adapted to allow for the vertical and lateral displacement of said carrier frame relative to said bars; a vertical guide member attached to the front of said carrier frame by means of a rotatable shaft, said shaft being journaled in the foremost end of said carrier frame and said guide member being rigidly centrally attached to said shaft; a horizontal cutter member below and attached to said guide member by means of two downwardly extending arms attached to said rotatable shaft, a forked member being attached to the lower end of each of said arms and engaging the one end of a connecting rod for limited movement vertically therein, and adjustment means being provided for regulating the vertical play of the connecting rod in the fork, said cutter member being attached to the free ends of the two connecting rods and being movable in response to any movement of the guide member; and means for laterally guiding said guide member and cutter member in relation to a beet to be topped.

3. In a beet topping machine, in combination, two spaced apart bars; a carrier frame attached to and disposed between said bars; a rotatable cross shaft journaled into said two bars at the rear ends thereof; pivotal means connecting the rear end of said carrier frame to said shaft, said means being adapted to allow for the vertical and lateral displacement of said carrier frame relative to said bars; a vertical guide member attached to said carrier frame by means of a second rotatable shaft journaled in the foremost end of said carrier frame; means for rotating said shafts in unison; a horizontal cutter member below and attached to said guide member, said cutter member being movable in response to any movement of the guide member; means for laterally guiding said guide member and cutter member in relation to a beet to be topped; and beet top conveying means mounted on said shafts whereby the cut tops may be conveyed rearwardly from the cutter member, said cutter member being provided with a rearwardly extending plate hinged to the rear edge of the cutter, a guide plate having a cut-away portion embracing the sides of said hinged plate and supporting loosely with its base edge the rear end of said hinged plate; and means for connecting said guide plate to said spaced apart bars.

4. A beet topping machine comprising a carrier frame, a rotatable shaft in the front end of said carrier frame, a topping mechanism, and a beet top conveyor, said topping mechanism including a vertically disposed toothed guide wheel rigidly attached centrally to said rotatable shaft, a horizontal cutter member connected to said guide wheel and movable therewith, means for displacing said guide wheel and cutter member laterally and vertically relative to said frame, a second rotatable shaft journaled in the rear end of the machine frame, an endless chain on either side of said guide wheel carried by said two rotatable shafts, outwardly projecting fingers attached at intervals to said chains, and power transmission means applied to said rear shaft.

ANDERS KARL KRISTIAN ANDERSEN.

REFERENCES CITED

The following references are of record in the file of this patent:

UNITED STATES PATENTS

| Number | Name | Date |
| --- | --- | --- |
| 770,793 | Blevins et al. | Sept. 27, 1904 |
| 1,308,921 | Smith | July 8, 1919 |
| 1,344,966 | Smith | June 29, 1920 |
| 1,389,708 | Smith | Sept. 6, 1921 |
| 2,337,698 | Walz | Dec. 28, 1943 |
| 2,430,665 | Briggs | Nov. 11, 1947 |
| 2,435,910 | Trinkle et al. | Feb. 10, 1948 |